United States Patent [19]

Hansen et al.

[11] Patent Number: 5,045,963
[45] Date of Patent: Sep. 3, 1991

[54] PROTECTIVE CIRCUIT FOR THE INDUCTION COIL OF A MAGNETICALLY INDUCTIVE FLOW METER

[75] Inventors: Henning M. Hansen, Nydamvej; Allan S. Pedersen, Kastanieallé, both of Denmark

[73] Assignee: Danfoss A/S, Nordborg, Fed. Rep. of Germany

[21] Appl. No.: 323,246

[22] Filed: Mar. 13, 1989

Related U.S. Application Data

[63] Continuation of Ser. No. 135,567, Dec. 21, 1987, abandoned, which is a continuation of Ser. No. 928,792, Nov. 10, 1986, abandoned.

[30] Foreign Application Priority Data

Nov. 28, 1985 [DE] Fed. Rep. of Germany ....... 3541974

[51] Int. Cl.⁵ .............................................. H02H 9/00
[52] U.S. Cl. ....................................... 361/87; 361/93; 361/57
[58] Field of Search .................. 361/42, 43, 54, 56, 361/18, 91, 93, 94, 101, 111, 79, 87, 57, 58, 98

[56] References Cited

U.S. PATENT DOCUMENTS

| | | | |
|---|---|---|---|
| 3,124,697 | 3/1964 | Trenchard | 361/56 X |
| 3,211,929 | 10/1965 | Prines et al. | 361/58 x |
| 3,213,349 | 10/1965 | Gutzwiller | 361/56 X |
| 3,314,001 | 4/1967 | Brockman | 361/58 X |
| 3,408,558 | 10/1968 | Peterson et al. | 361/56 X |
| 3,454,834 | 7/1969 | Giannamore | 361/111 X |
| 3,473,069 | 10/1969 | Herbert, III | 361/56 X |
| 3,522,480 | 8/1970 | Routh et al. | 361/58 |
| 3,527,997 | 9/1970 | Nercessian | 361/91 X |
| 3,614,531 | 10/1971 | Oswald | 361/56 |
| 3,631,264 | 12/1971 | Morgan | 361/56 X |
| 3,809,999 | 4/1974 | Smith | 361/18 X |
| 3,887,849 | 6/1975 | Nagel | 361/56 X |
| 3,887,860 | 6/1975 | Bernhardt et al. | 361/56 X |
| 3,973,170 | 8/1976 | Hogan | 361/91 X |
| 4,079,211 | 3/1978 | Janssen | 361/91 X |
| 4,079,436 | 3/1972 | Brown | 361/56 X |
| 4,118,749 | 10/1978 | Matuzaki et al. | 361/56 X |
| 4,158,214 | 6/1979 | Bolus et al. | 361/56 X |
| 4,181,921 | 1/1980 | Taylor et al. | 361/56 |
| 4,199,797 | 4/1980 | Kusumi | 361/56 |
| 4,323,942 | 4/1982 | Hartman et al. | 361/56 |
| 4,412,265 | 10/1983 | Buuck | 361/56 |
| 4,428,023 | 1/1984 | Maier | 361/57 X |
| 4,434,396 | 2/1984 | Montague | 361/111 X |
| 4,528,608 | 7/1985 | Anderson et al. | 361/94 X |
| 4,594,632 | 6/1986 | Unnewehr | 361/56 X |
| 4,695,916 | 9/1987 | Satoh et al. | 361/56 |

Primary Examiner—William M. Shoop, Jr.
Assistant Examiner—A. Jonathan Wysocki
Attorney, Agent, or Firm—Wayne B. Easton

[57] ABSTRACT

The invention relates to a protective circuit for the induction coil of a magnetically inductive type flow meter. If the leads of a flow meter used in an explosive environment are cut there can occur a high voltage and resulting sparking which could cause an explosion. The invention provides a circuit in which a short circuit path is provided for the induction coil if the leads thereof are severed to prevent the development of a high voltage which could cause dangerous sparking.

4 Claims, 1 Drawing Sheet

PROTECTIVE CIRCUIT FOR THE INDUCTION COIL OF A MAGNETICALLY INDUCTIVE FLOW METER

This application is a continuation of Ser. No. 07/135567 filed 12-21-87, now abandoned, which is a continuation of Ser. No. 06/928992 filed 11-10-86, now abandoned.

The invention relates to a protective circuit for the induction coil fed with A.C. pulses in a magnetically inductive flow meter.

BACKGROUND OF THE INVENTION

Magnetically inductive flow meters such as known from U.S. Pat. No. 4,614,121 work on the principle that a magnetic field is produced of a given size and the voltage induced in the flowing liquid is measured transversely to the magnetic field.

For this purpose, the induction coil is alternately fed with positive and negative current pulses of a predetermined value. The pulses may be separated from each other by a passage through zero and/or by a pause between them. Measurement always takes place after the end of a pulse, after all transitory conditions have decayed. For example, the polarity of the current changes from eight to ten times per second. The induction coil has an inductance of, for example, 100 to 600 mHy. The energizing current is in the order of $\pm 0.1$ to 0.2 A.

If, during the operation of such a flow meter, the supply line is interrupted, for example because a plug is removed, a high voltage is set up at the point of interruption by reason of the inductance of the coil and this can lead to sparking. This is particularly so if the leads are first short circuited and then separated again, as is the case when the leads are accidentally cut by pliers. In this case, because of the small space between the leads, even lower voltages will produce a spark. It was therefore not possible to place a magnetically inductive flow meter in an explosion risk zone.

SUMMARY OF THE INVENTION

The invention is based on the problem of providing a protective circuit of the aforementioned kind which permits a magnetically inductive flow meter also to be used in rooms where there is a risk of explosions.

This problem is solved according to the invention in that the induction coil is firmly connected to a current receiving circuit which bridges same and has two Miller integrators of which, depending on the direction of the current, one is active and the other is inactive by means of a bridging diode, and that in the leads in the non-explosion risk zone there is a two-part current limiting circuit of which, depending on the direction of the current, one part is active and the other is inactive by means of a bridging diode.

By reason of the respectively active Miller integrator, upon an interruption in the leads, the current receiving circuit initially acts as a short circuit path for the induction coil and then assumes a high resistance depending on the charging of the condenser which belongs to the Miller integrator and which gradually controls the associated transistor arrangement into the non-conductive state. The time dependencies can readily be designed so that no dangerously excessive voltages are produced at the point of interruption. However, the current receiving circuit which is designed for both directions of current will also act as a short circuit when the polarity of the current pulses changes. For this reason, there is the current limiting circuit which ensures that this short circuit will not overload the current generator. Since these procedures occur on commencement of the current pulse, the actual measurement taking place at the end of the current pulse is not influenced. The bridging diodes ensure that the circuits are equally effective for both polarities of the current pulses.

It is particularly favourable if the two Miller integrators have a common condenser. This affords a saving of material. In addition, a comparatively small condenser can produce a short circuiting period sufficient for the decay of the coil current because this condenser will, upon an interruption in the conductors, first become discharged and then charged in the other direction to operate the associated transistor arrangement.

In a preferred embodiment, in the current receiving circuit the collector-emitter paths of two transistor arrangements form a first series circuit, have mutually opposite pass directions, and are each bridged by a bridging diode which is conductive in the opposite direction, and the bases of the transistor arrangements are disposed at the tappings of a second series circuit which consists of a first resistor, a second resistor in series with a condenser, and a third resistor, and bridges the induction coil in the same way as the first series circuit. This gives a very simple symmetrical construction. By allocating the bridging diodes to the respective transistor arrangements, one ensures in a simple manner that the current receiving circuit is effective in both directions.

It is also advisable for two current receiving circuits to be firmly connected in parallel. This double safety factor permits the protective circuit to be allocated to a high quality grade in which proper functioning is not impeded even if one of the circuit components fails.

Preferably, in the current limiting circuit the collector-emitter paths of two transistor arrangements are in series with each other and with at least one current measuring resistor, have mutually opposite pass directions and are each bridged by a bridging diode which is conductive in the opposite direction, and the voltage drop at the current measuring resistor controls that transistor arrangement which is active. Here, again, the allocation of the bridging diode to the respective transistor arrangement ensures in a single manner that the current limiting circuit will be effective for positive and negative current pulses.

The two parts of the current limiting circuit may have a common current measuring resistor. This enables the number of resistors to be reduced.

It is particularly favourable if the current limiting circuit is also provided with a current increase limiter. This can, for example, occur with the aid of a condenser which charges from commencement of the pulses and, with an increase in voltage, increasingly controls a transistor arrangement into the conductive state. If, upon commencement of the current pulse, the current receiving circuit acts as a short circuit, the current can increase only according to a predetermined increase function. When the final value of the current limiter has been reached, the current receiving circuit will likewise have approached its high final resistance value.

A particularly simple embodiment is obtained if each transistor arrangement is associated with a control transistor of which the base-emitter path is in parallel with the current measuring resistor, the collector-emitter path is bridged by a condenser and the collector is connected to the base of the transistor arrangement and, by way of a resistor, to its collector. The condenser ensures the desired gradual increase in current.

Desirably, each lead contains a two-part current limiting circuit. If one fails, the other remains effective.

It is also favourable for the voltage between the leads to be limited in the non-explosion risk zone by a voltage limiting circuit which is effective in both directions. The current limiting circuit may, for example, consist of Zener diodes.

Advantageously, the transistor arrangements each comprise two transistors in Darlington circuit and form an integrated circuit together with the associated bridging diode. Such integrated circuits can be readily purchased and can therefore by easily incorporated in the circuit. In particular, the integrated circuit may also comprise the base-emitter resistors of the two transistors and define the first and third resistors of the second series circuit.

BRIEF DESCRIPTION OF THE DRAWING

A preferred example of the invention will now be described in more detail with reference to the drawing, wherein.

DESCRIPTION OF THE PREFERRED EMBODIMENT

Figures 1, 2, 3:
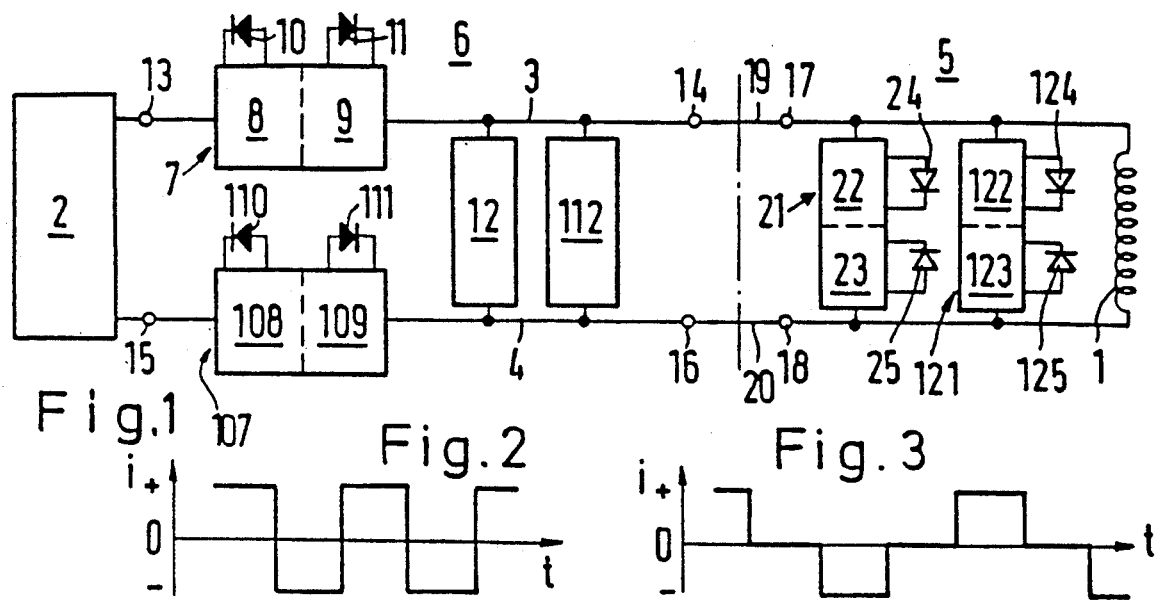
FIG. 1 is block diagram of the protective circuit according to the invention.
FIG. 2 is a diagram of the current pulses fed to the induction coil.
FIG. 3 is a diagram showing modified current pulses.

According to FIG. 1, an induction coil 1 of a magnetically inductive flow meter is alternatively fed with positive and negative current pulses. The pulses may follow each other directly (FIG. 2) or exhibit a pause when passing through zero (FIG. 3). The individual pulses have, for example, a duration of 60 ms and an amplitude of 125 mA; the pause may also be 60 ms. The connection of a current supply circuit 2 may be by way of two leads 3 and 4.

The induction coil 1 is in an explosion risk zone 5 whereas the current supply circuit 2 is disposed in a non-explosion risk zone 6.

In the lead 3 there is a current limiting circuit 7 consisting of two parts 8 and 9 which can each be made inactive by a bridging diode 10 or 11 depending on the direction of the current. A corresponding current limiting circuit 107 with parts 108 and 109 each bridged by a bridging diode 110 or 111 is disposed in the lead 4. Between the leads 3 and 4 there are two voltage limiting devices 12 and 112. In the same way as the current limiting circuits 7 and 107, these are disposed in the non-explosion risk zone 6. The lead 3 therefore extends between the terminals 13 and 14 and the lead 4 between the terminals 15 and 16. By way of cables 19 and 20, the terminals 17 and 18 of coil 1 are releasably connected to the terminals 14 and 16 and fixed to two current receiving circuits 21 and 121. Each current receiving circuit consists of two Miller integrators 22, 23 or 122, which, by means of a respective bridging diode 24 and 25 or 124 and 125, can be made inactive depending on the direction of the current.

Figure 4:
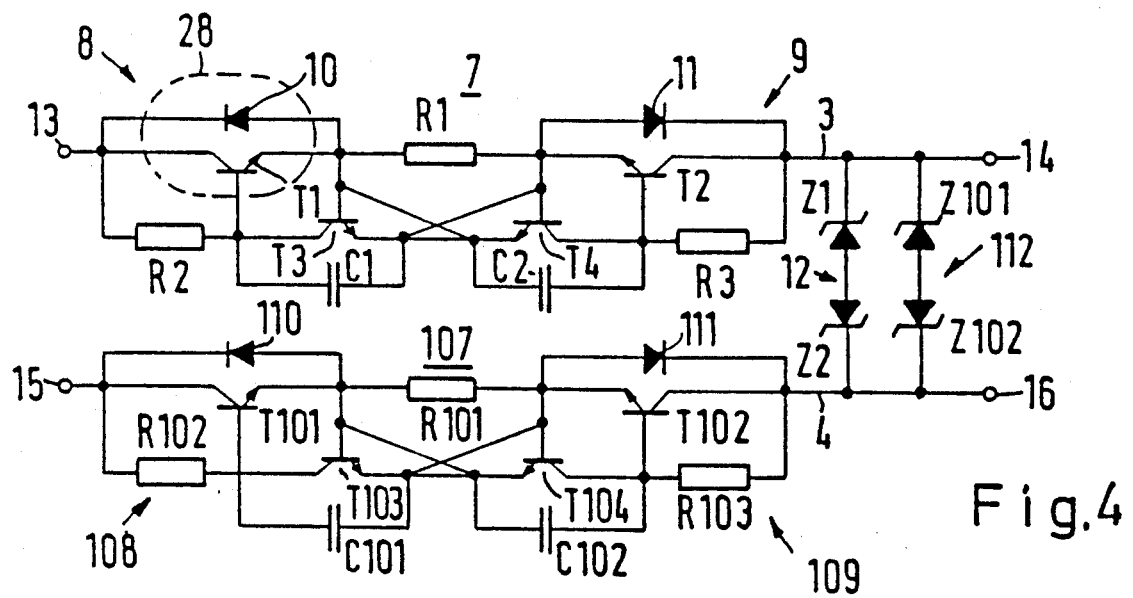
FIG. 4 shows one embodiment of the current limiting circuit.

The current limiting circuit 7 and 107 as well as the voltage limiting circuits 12 and 112 may have the construction shown in FIG. 4. Between the terminals 13 and 14 there is the series circuit of a current measuring resistor R1 and the collector-emitter paths of two transistor arrangements T1 and T2. These collector-emitter paths have mutually opposite pass directions and are bridged by the bridging diode 10 or 11 of opposite pass direction. A control transistor T3 has its base-emitter path in parallel with the current measuring resistor R1. Its collector-emitter path is bridged by a condenser C1. Its collector is connected to the base of the transistor arrangement T1 and, by way of a resistor R2, to its collector. Similarly, there is a control transistor T4 of which the base-emitter path is in parallel with the current measuring resistor R1, its collector-emitter path is bridged by a condenser C2 and its collector is connected to the base of the transistor arrangement T2 and, by way of a resistor R3, to its collector. The current limiting circuit 108 has the same construction. Reference numerals increased by 100 are employed. The voltage limiting circuit 12 consists of two series-connected Zener diodes Z1 and Z2 having opposite pass directions. Similarly, the voltage limiting circuit 112 consists of two Zener diodes Z101 and Z102.

Figures 5, 6:
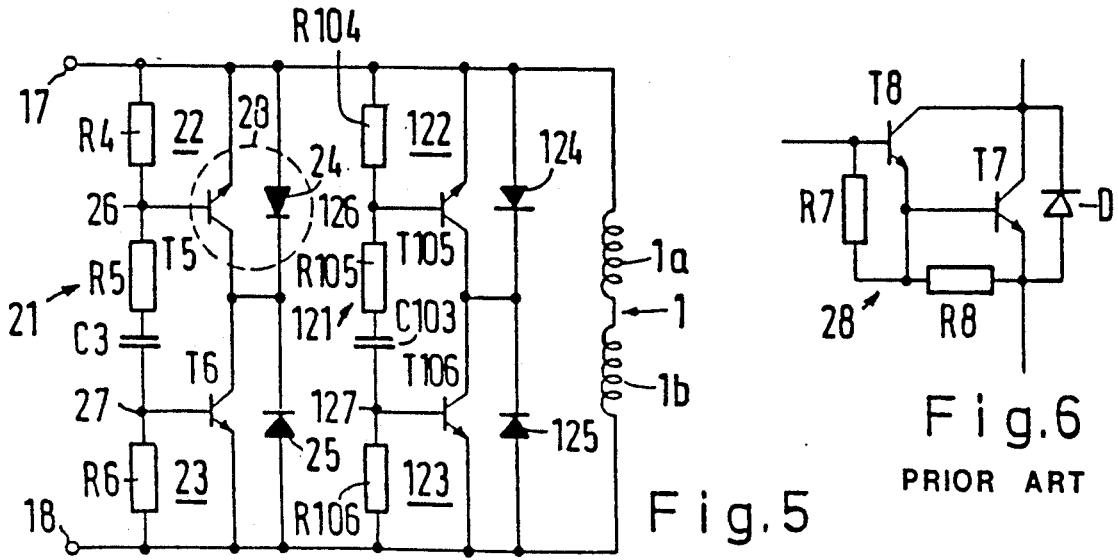
FIG. 5 shows one embodiment of the current receiving circuit.
FIG. 6 shows an integrated circuit that can be used in accordance with the invention.

FIG. 5 illustrates an embodiment of the measuring head arranged in the explosion risk zone 5, with the induction coil 1 which here consists of two series-connected individual coils 1a and 1b, and the two current receiving circuits 21 and 121. The current circuit receiving 21 comprises two transistors 75 and 76, of which the collector-emitter paths form a series circuit, have mutually opposite pass directions, and are each bridged by a bridging diode 24 or 25. The bases of the transistor arrangements are connected to tappings 26 and 27 which are formed by a second series circuit consisting of a first resistor R4, a second resistor R5 in series with a condenser C3, and a third resistor R6. The current receiving circuit 121 has the same construction.

In this way, two oppositely acting Miller integrators are formed in each current receiving circuit and comprises a common integration condenser C3. If, for example, a positive voltage is applied to the thermal 17, a short circuit is practically produced by way of the bridging diode 24 and the collector-emitter path of a transistor arrangement T6. Simultaneously, however, the condenser C3 is charged by way of the second series circuit and the voltage drop across the resistor R6 decreases so that the transistor arrangement T6 is blocked after a short period and hence the entire current receiving circuit assumes a higher resistance. The Miller principle is based on the fact that with the aid of a comparatively small integration condenser C3 one controls a substantially larger integration current. With a voltage acting in the opposite direction, the first short circuit current flows through the bridging diode 25 and the collector-emitter path of the transistor arrangement T5.

FIG. 6 shows a conventional integrated circuit 28 comprising two transistors T7 and T8 in Darlington circuit, a diode D and two base-emitter resistors R7 and R8. This circuit 28 can be employed instead of the combinations shown in broken lines in FIGS. 4 and 5 and consisting of a transistor arrangement and associated diode. If the circuit parameters are chosen accordingly, the first and third resistors R4 and R6 of the second series circuit may even be dispensed with because they are respectively replaced by the resistors R7, R8.

It will be assumed that during normal operation the cable 19 is interrupted during a positive current pulses. The current in the induction coil 1 will then tend to continue to flow using the short circuit path through the bridging diode 25 and the collector-emitter path of the transistor arrangement T5 (the same applies to the second current receiving circuit 121). The previously positively charged condenser C3 is discharged through the coil 1 and is finally charged in the opposite direction. This reduces the voltage drop at the resistor R4 until the transistor arrangement T5 finally blocks. All this takes place without any considerable voltage build-up between the terminals 17 and 18, so that no excessively high voltage that might cause sparking occurs at the point of interruption. If the interruption occurs during the negative current pulse, the current receiving circuit will operate in an analogous manner but this time the short circuit path is formed by the bridging diode 24 and the transistor arrangement T6.

The current receiving circuit 21 or 121 will also produce a short circuit each time the polarity of the current is changed. This short circuit would impermissibly overload the current supply circuit 2, which is prevented by the current limiting circuit 7 and 107. When a positive current pulse is to be supplied, it flows through the collector-emitter path of the transistor arrangement T1, the current measuring resistor R1 and the bridging diode 11 to the induction coil 1 and through the collector-emitter path of the transistor arrangement T102, the current measuring resistor R101 and the bridging diode 110 back to the current control circuit 2. The condenser C1 which charges only gradually ensures that the current increase is limited. The current through the transistor arrangement T1 does therefore not immediately reach its final value but only after a certain period. The latter is such that in the meantime the condenser C3 of the current receiving circuit 21 is charged and the latter therefore assumes a high resistance. During further operation, the transistor arrangement T1 is brought by way of the control transistor T3 from the voltage drop at the current measuring resistor R1 to the desired amplitude value of, for example, 125 mA. This limiting value of the current is maintained during a short circuit. In some cases, this limitation will alone suffice to keep the short circuit current low when charging the Miller integrator. The same function is also fulfilled by the transistor arrangement T102 of the second current limiting circuit 107. Upon a negative current pulse, the current passes through the collector-emitter path of the transistor arrangement T101, the current measuring resistor R101, the bridging diode 111, the induction coil 1, the collector-emitter path of the transistor arrangement T2, the current measuring resistor R1 and the bridging diode 10.

The functions of current limiting control and current increase limiting control could also be separated from each other. For example, each part 8, 9, 108, 109 of the current limiting circuit 7, 107 may contain a conventional current regulator in series with a further transistor of which the base-emitter path is bridged by the condenser that charges on commencement of the pulse.

The Zener diodes Z1, Z2 may also be so connected that on the one hand they are connected by way of a diode of opposite pass direction to the one lead and on the other hand to the base of a transistor arrangement in the other lead.

Such a protective circuit permits the measuring head of a magnetically inductive flow meter also to be employed in rooms in which there is a risk of explosions.

We claim:

1. A magnetically inductive flow meter installation, comprising, an explosion risk zone and an explosion risk-free zone, an induction coil, a current reception circuit in said risk zone which includes said induction coil, first and second transistors each being effectively in parallel with said coil and arranged in mutually oppositely passing directions, a current supplying circuit in said risk-free zone connected to said current reception circuit for supplying positive and negative current pulses to said induction coil, control means for said transistors connected in parallel with said induction coil, said control means being operable during each of said positive and negative pulses to first bias a corresponding one of said transistors to a short circuiting conducting state and then to a blocking state, said control means being similarly operable to effect short circuiting of said induction coil through one of said transistors whenever the voltage in said current reception circuit rises due to an interruption of current flow in said current supplying circuit; and bidirectional current limiting means in said current supplying current being operable during normal operation whenever said short circuiting occurs by reason of said transistors being biased to short circuit conducting states by said positive and negative pulses.

2. A magnetically inductive flowmeter installation according to claim 1 wherein said first and second transistors have mutually opposite pass directions and are connected with the collector-emitter paths thereof in series, and diode means connected respectively in anti-parallel to each of said transistors.

3. A flow meter installation according to claim 1 or 2 wherein said control means comprises a resistor-capacitor series circuit and first and second resistors connected to opposite ends thereof in series therewith, said first and second transistors having respective bases connected to said opposite ends of said resistor-capacitor series circuit.

4. A flow meter installation according to claim 1, wherein in said blocking state conditions said positive and negative current pulses are applied to said coil to facilitate measurements relative to said coil during said blocking states.

* * * * *